United States Patent [19]

Roberts

[11] 4,014,130
[45] Mar. 29, 1977

[54] FISH HOOK EXTRACTION TOOL
[76] Inventor: Allen Roberts, 3006 NE. 19th St., Fort Lauderdale, Fla. 33305
[22] Filed: Feb. 20, 1976
[21] Appl. No.: 659,669
[52] U.S. Cl. .............................................. 43/53.5
[51] Int. Cl.² ..................................... A01K 97/00
[58] Field of Search .................................... 43/53.5
[56] References Cited
UNITED STATES PATENTS

| 1,611,544 | 12/1926 | Maurus ............................... | 43/53.5 |
| 2,091,893 | 8/1937 | Tillinghast ........................... | 43/53.5 |
| 3,377,735 | 4/1968 | Daughtry ............................ | 43/53.5 |
| 3,721,034 | 3/1973 | Collins ................................ | 43/53.5 |

Primary Examiner—Warner H. Camp
Attorney, Agent, or Firm—Jack D. Slobod

[57] ABSTRACT

A fish hook extraction tool fashioned from a single length of pipe which is conically flared at one end. V-shaped notches are spaced along the periphery of the flare for engaging a fish hook and an elongated slot in the pipe wall communicates with the flare for guiding the tool along a fishing line to the hook within the fish. The other end of the pipe is bent approximately 90° and diametrically slotted to engage the fishing line.

1 Claim, 4 Drawing Figures

FISH HOOK EXTRACTION TOOL

FIELD OF THE INVENTION

The present invention relates generally to fish hook extraction tools. In its particular aspects the present invention relates to a fish hook extraction tool fashioned from a single length of pipe.

BACKGROUND OF THE INVENTION

Various tools have heretofore been suggested for extracting a fish hook from within the mouth of a fish. These prior art tools have provided difficulty in properly finding and engaging the fish hook. Further, such prior art tools have been expensive and generally too complicated to be fashioned by the usual fisherman. The pertinent prior art patents of which the aplicant is aware are U.S. Pat. Nos. 2,777,244 to McKinley, and 3,670,448 to Wehmeyer.

OBJECTS OF THE INVENTION

It is an object of the invention to provide a simple and inexpensive fish hook extracting tool which has means for guiding the tool along a fishing line to the fish hook.

It is another object of the present invention to provide a fish hook extraction tool which is easily fashioned from a length of metal pipe or tubing.

SUMMARY OF THE INVENTION

Briefly, the aforementioned and other objects of the present invention are satisfied by providing a fish hook extraction tool fashioned from a single length of pipe which is conically flared at one end and provided with V-shaped notches spaced about the periphery of the flare for engaging a fish hook.

A longitudinally directed slot in the pipe wall communicates with the flared end and enables the tool to be guided along a fishing line to the hook.

The opposite end of the pipe is bent to form a handle, and a diametrically aligned pair of nothces at the end of the handle are provided to engage the fishline, enabling the line to be wrapped around the handle sufficiently to urge the hook into engagement with the flared end.

Other objects, features and advantages of the present invention will become apparent upon persual of the following detailed description of the preferred ebmodiment thereof when taken in conjunction with the appended drawing wherein.

DETAILED DESCRIPTION

Figure 1:
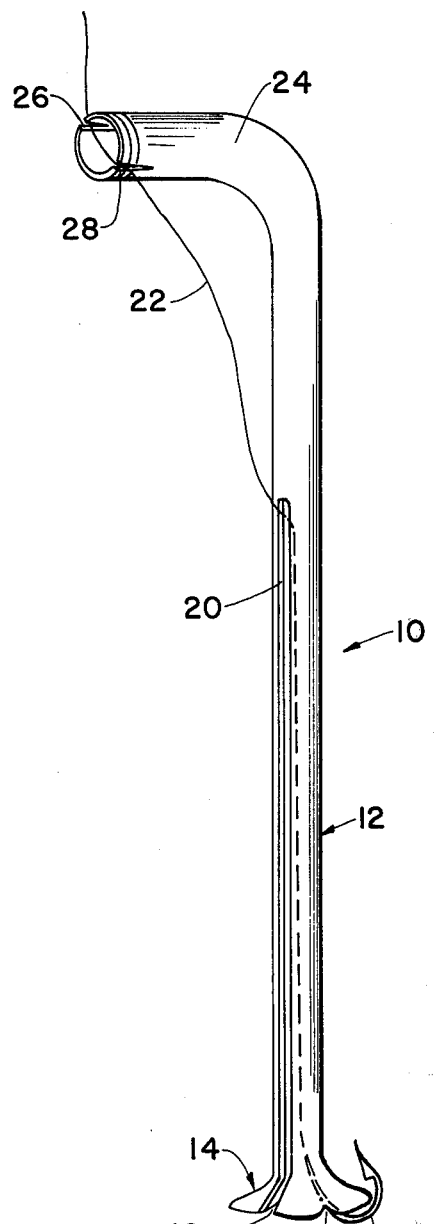
FIG. 1 is a longitudinal view of the tool of the present invention.
Figure 2:
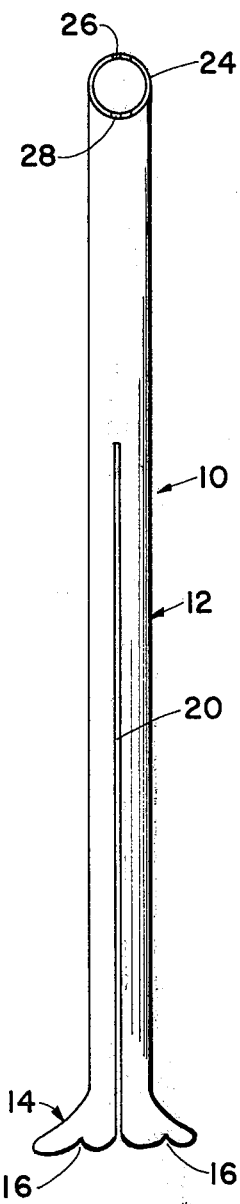
FIG. 2 is also a longitudinal view of the tool but as viewed when rotated approximately 45° about a vertical axis.
Figure 3:
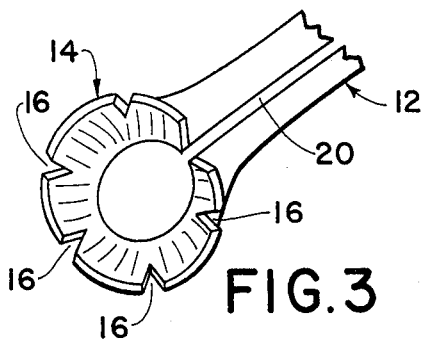
FIG. 3 is a pictorial presentation of the bottom end of the tool in FIGS. 1 and 2.

Referring to FIGS. 1 through 4 of the drawing the fish hook extraction tool 10 of the present invention is fashioned entirely from a length of metal pipe 12. Pipe 12 has a generally frustoconical flare or bell 14 at one end. Plural V-shaped notches 16 are cut into the circular periphery of flare 14 at angularly spaced locations for engaging a fish hook 18.

An elongated longitudinally directed slot 20 in the wall of pipe 12 runs along flare 14 and thence along a majority of the length of pipe 12. The slot 20 is of a width for slideably receiving a fishing line 22 carrying hook 18 at its end.

The end of pipe 12 remote from flare 14 is bent approximately perpendicular to the remaining portion of the pipe to form a handle portion 24. A pair of diametrically opposed V-shaped notches 26 and 28 in the wall of pipe 12 at the free end of handle portion 24 are provided for engaging fishing line 22. The notches 26 and 28 are preferably in line with slot 20 as viewed in FIG. 2.

Figure 4:
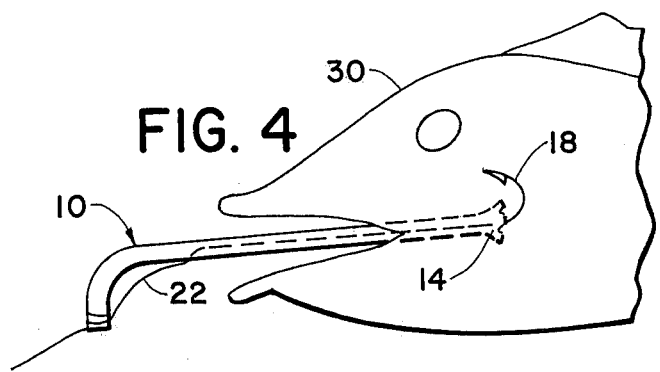
FIG. 4 depicts the tool of FIGS. 1–3 in use for extracting a fish hook.

As illustrated in FIG. 1 and 4, tool 10 is placed over the fishing line 22 with the line received in slot 20. The tool 10 is then guided along the fishing line, with flare 14 facing into the mouth of the fish 30. Thus, the fishing line is located interior of pipe 12 over the length of slot 20 and then exits pipe 12 at the top of the slot. Preferably, te line 22 is also guided then serially through slots 28 and 26.

When the flare 14 encounters hook 18, the tool 10 is rotated. slightly to seat the hook in one of the notches 16. Next, the portion of the fishing lin 22 exposed between the top of slot 20 and the lower notch 28 is grasped and wound about hangle portion 24 to tension the fishing line and thereby pull hook 18 against the inwardly converging sides of the notch 16. With the hook 18 retained by tool 10, the tool is pushed further into the mouth of fish 30 dislodging hook 18. Thereby, the hook 18 is carried out with the tool 10 from the mouth of fish 30.

It should be appreciated by those skilled in the art, that the tool 10 may be fabricated quite easily from relatively thin walled metal tubing.

While the preferred embodiment of the present invention has been described in specific detail, it should be understood that numerous modifications, additions and omissions in the details thereof are possible within the intended spirit and scope of the invention claimed herein.

What is claimed is:

1. A fish hook extraction tool comprising: a pipe having a generaly conical flare at one end; plural nothces spaced about the periphery of said flare for engaging a fish hook; a longitudinally directed slot in said pipe communicating with said flare for guiding said tool along a fishing line; the opposite end of said tool being bent to form a handle; and diametrically opposed notch means in said opposite end for secruely engaging said fishing line.

* * * * *